INVENTOR.
HERBERT F. WIEGANDT
BY
Hooper Leonard & Buell
HIS ATTORNEYS

May 17, 1966 H. F. WIEGANDT 3,251,193
CONCENTRATION SYSTEM FOR SALINE WATER OR THE LIKE
Original Filed April 12, 1961 4 Sheets-Sheet 2
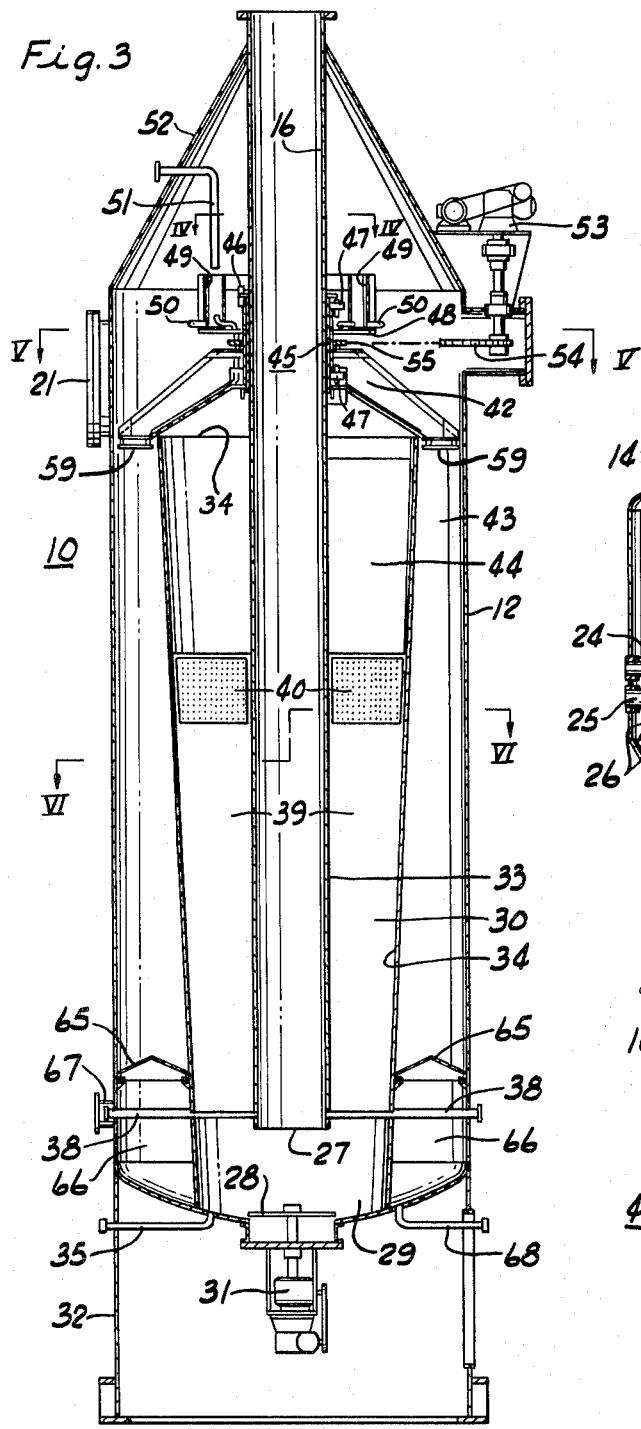
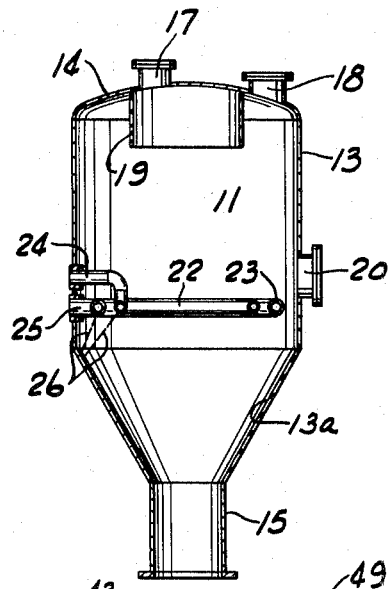
INVENTOR.
HERBERT F. WIEGANDT
BY
Hooper Leonard & Buell
HIS ATTORNEYS May 17, 1966 H. F. WIEGANDT 3,251,193
CONCENTRATION SYSTEM FOR SALINE WATER OR THE LIKE
Original Filed April 12, 1961 4 Sheets-Sheet 3

INVENTOR.
HERBERT F. WIEGANDT
BY
Hooper Leonard & Buell
HIS ATTORNEYS

May 17, 1966 H. F. WIEGANDT 3,251,193
CONCENTRATION SYSTEM FOR SALINE WATER OR THE LIKE
Original Filed April 12, 1961 4 Sheets-Sheet 4

INVENTOR.
HERBERT F. WIEGANDT
BY
Hooper Leonard & Buell
HIS ATTORNEYS

United States Patent Office 3,251,193
Patented May 17, 1966

3,251,193
CONCENTRATION SYSTEM FOR SALINE
WATER OR THE LIKE
Herbert F. Wiegandt, 106 Hampton Road, Ithaca, N.Y.
Continuation of application Ser. No. 102,583, Apr. 12,
1961. This application Dec. 14, 1964, Ser. No. 419,289
8 Claims. (Cl. 62—58)

This is a continuation application of patent application 102,583, filed April 12, 1961. This invention relates to a system utilizing freezing, washing and melting for conversion of aqueous solutions to relatively solute-free water. More particularly, this invention pertains to apparatus and method for continuously forming ice crystals using an immiscible vaporizable refrigerant and subsequently washing and melting such ice crystals to recover solute-free water.

The resource needs of various countries of the world including the United States have shown that there are considerable problems inherent in the matter of producing potable water from sea water or other saline water on a scale large enough to have significance and at the same time be commensurate with the ability of those having to provide such potable water by conversion from saline water to pay for the cost of such conversion operation. Background interest in the general matter of water resources and water recovery problems presented thereby have been discussed in an article by Professor E. R. Gilliland published in Industrial and Engineering Chemistry issue of December 1955, vol. 47, pages 2417 et seq.

In the method and apparatus of this invention, continuous freeze crystallization, washing of the resultant ice and the melting thereof are provided in unitary equipment representing relatively moderate capital outlay and capable of being operated and maintained effectively at relatively lower cost than prior practices to produce substantially solute-free water continuously in relatively large quantities.

Other objects, features and advantages of this invention will be apparent from the following description and the accompanying drawings, which are illustrative only, in which FIGURE 1 is a schematic flow diagram illustrating one embodiment of my invention including a combination freezer-washer-melter of this invention;

FIGURE 2 is a view in elevation and section through the axis of the freezer portion of the embodiment shown in FIGURE 1;

FIGURE 3 is a view in elevation and section taken along the axis of the washer-melter portion of the embodiment shown in FIGURE 1;

FIGURE 8 is a detail view taken along line VIII—VIII of FIGURE 4; and

Figure 1:
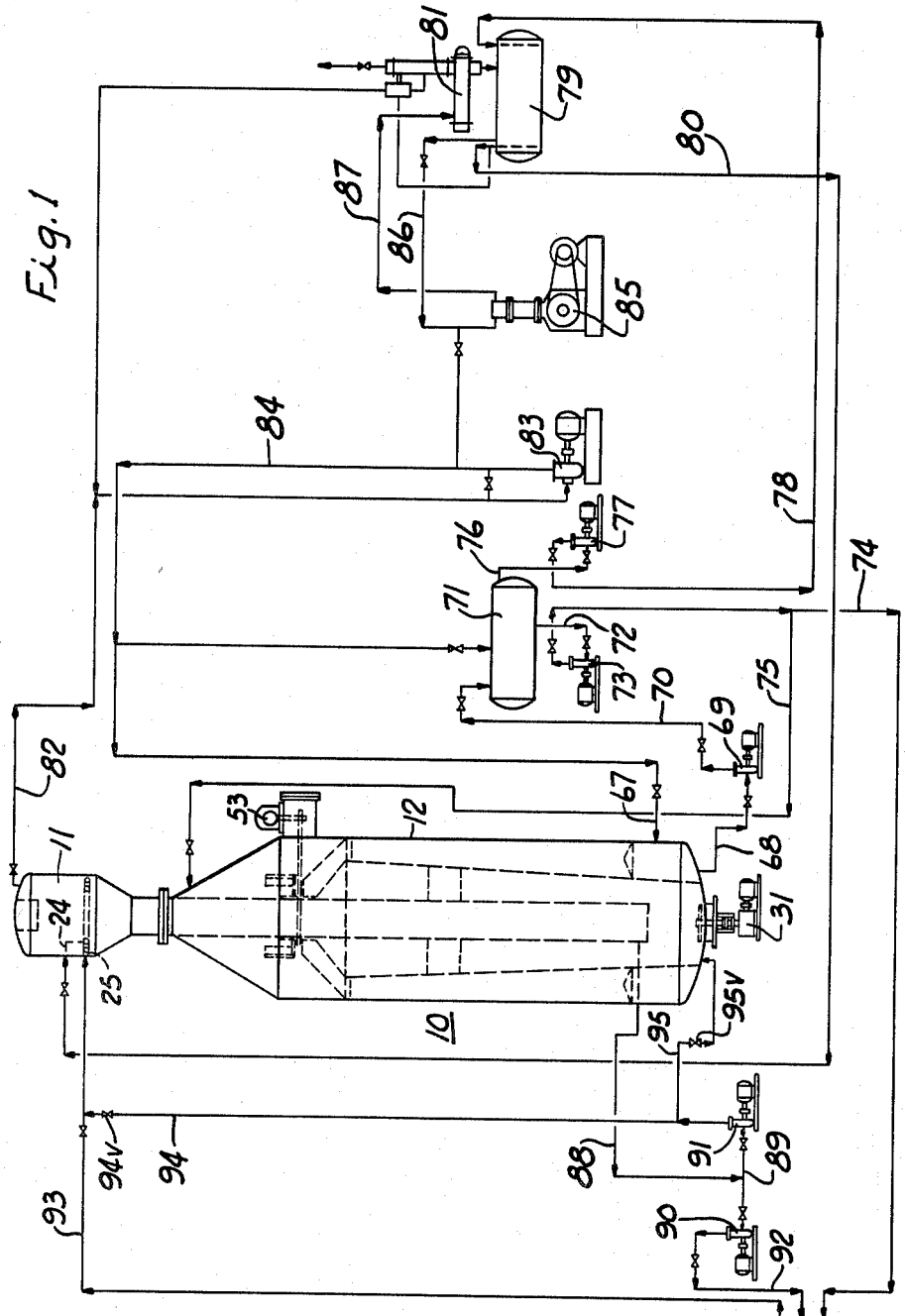
Figure 4:
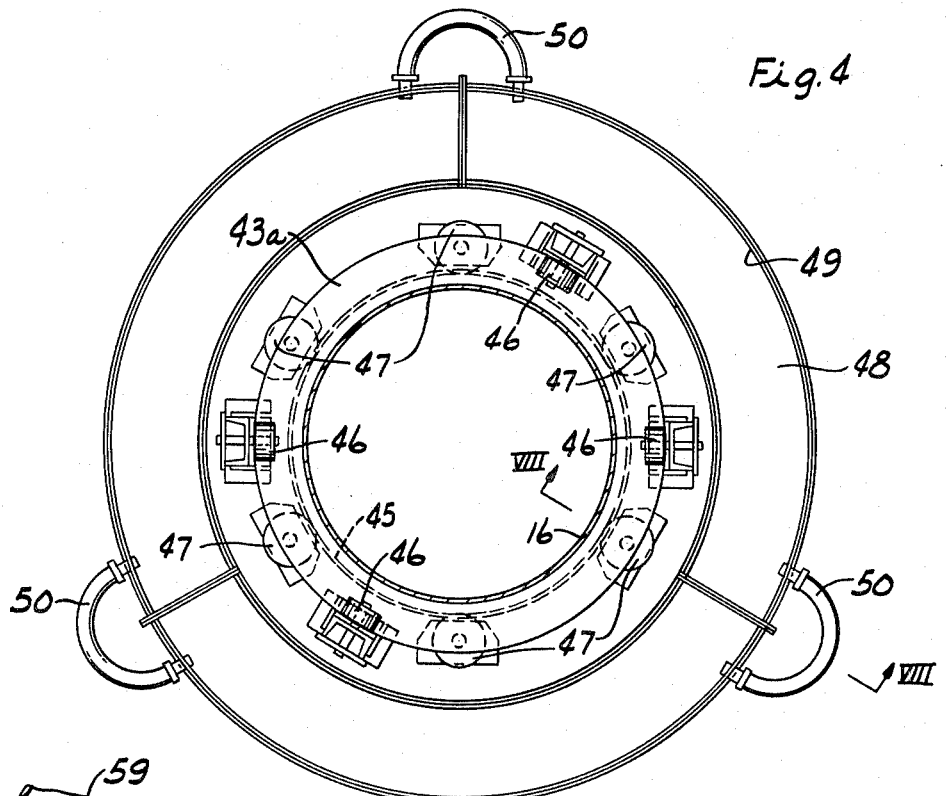
FIGURE 4 is a view in section taken along line IV—IV of FIGURE 3.
Figure 5:
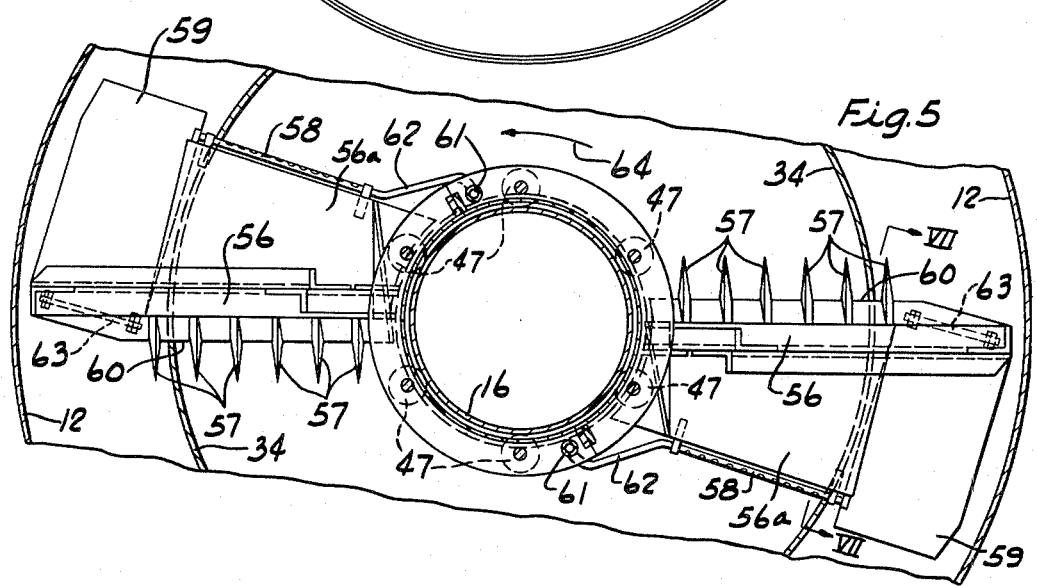
FIGURE 5 is a view in section taken along line V—V of FIGURE 3.

Referring to FIGURES 1 to 3, inclusive, of the drawings, there is shown therein a freezer-washer-melter vessel 10 having a freezer portion 11 surmounting and joined to a washer and melter portion 12 in an exemplary embodiment of this invention to provide potable water or other specification water of reduced salinity from sea water or other saline water including brackish water. Another form which the invention may take, employing the same principles, is illustrated in end elevation and section in FIGURE 9.

Freezer 11 comprises a closed generally cylindrical shell 13 having a head 14, a mixing surface 13a in the form of an inverted conical frustum and a flanged conduit 15 to permit non-gaseous effluent materials from freezer 11 to flow downwardly into an inner tube 16 in device 12, the freezer portion 11 normally being fixed to device 12 as shown in FIGURE 1. Head 14 is provided with a number of light and sight glasses 17 near its center and with a refrigerant vapor outlet 18. A cylindrical internal skirt 19 is provided to separate outlet 18 from the observation ports 17. Access ways 20 and 21 with removable covers are provided at appropriate places throughout the apparatus for use as handholes, manholes, or serviceways, as the case may be or require.

Within freezer 11 an inner sparging ring 22 and an outer sparging ring 23 are provided in coaxial pancake form and respectively connected to a vaporizable liquid refrigerant supplying pipe by connection 24 and to a saline water feed pipe by a connection 25. The respective sparging rings 22 and 23 are provided around the lower portions of each thereof with jet spray openings directed so that the stream therefrom will strike mixing surface 13a as shown by the dotted lines 26 to promote mixing of the respective streams and the flash freezing of the saline water. Although butane sparging ring 22 as illustrated has its openings directed toward the upper portion of mixing surface 13a, it also may be provided with two sets of openings, both directed toward such mixing surface with one set directed more downwardly than the other. The first jet thus provides seed crystallization and the second set causes growth thereof by further crystallization. Thus, the arrangement of the spray jets can be oriented to promote rapid mixing of refrigerant and saline water for some virtually instant vaporization and further vaporization by location of jets to introduce refrigerant farther along the flow path of saline water to prolong time available for crystal growth and formation. Such contributes to the growth of crystals greater in size.

The pressure within freezer 11 is below the vapor pressure of the liquid refrigerant so that it will evaporate as it takes up heat from the saline water on mixing therewith. Transfer of heat from the saline water required for complete vaporization of refrigerant freezes a portion of the saline water feed producing ice and a more concentrated saline water. The ratio of refrigerant to saline water is at least such that the concentrated brine will not contain so much solute as to prevent formation of pure ice, e.g. in the case of salt solution not over 23%, and preferably even more dilute to insure that the liquid and ice comprise a freely flowing slush. The refrigerant vapor exits through outlet 18 while the mixture of ice and concentrated saline water flows down and through conduit 15 into inner column 16.

The proportion of concentrated saline water and ice may be regulated as by recycling saline water, such that together they will form slush ice or slurry which will flow downwardly through the entire length of column 16 and under the bottom edge 27 thereof in a radially outward direction. A rotating slush ice distributor 28 is provided in an inner chamber 29 which connects the bottom of inner column chamber 16 and the bottom of an annular middle column chamber 30, the distributor 28 being provided to facilitate the flow of slush ice outwardly from column 16 into annular column 30. This flow is primarily caused by a difference in the respective hydraulic heads above chamber 29, head in column 16 being greater than the head in column 30. A prime mover 31 is provided on the bottom of device 12 to operate distributor 28. A base 32 for device 10 supports it on an appropriate foundation.

Intermediate annular column 30 has an inner wall 33 comprising the outside of tube 16 and an outer wall 34 in the form of an inverted frustum of a cone so that the walls 16 and 34 diverge upwardly somewhat, in the same direction as the materials flow therein, facilitating the rising movement of ice in column 30. The inner surface of wall 34 may be coated with some relatively frictionless material to further facilitate the upward passage of ice through column 30. The ice is carried by the flow of concentrated saline water into column 30 where the ice adds to and continuously forms a relatively compact but liquid-permeable bed. The upward movement of the bed of ice through column 30 is controlled by adjusting the difference in hydraulic heads of columns 16 and 30.

The depth of the bed of ice in annular column 30 is controllable by varying the rate of flow of saline water up the column. This may be accomplished by recycle of saline water upwardly into the chamber 30 introduced either into chamber 29 through inlet 35 or at the saline water sparging ring 25, or both. The recycle saline water so introduced may be of the same concentration as the reject saline water. The liquid introduced into column 30 at or from the lower end therof percolates upwardly through the consolidated bed of ice in column 30 in concurrent fashion toward the perforated filter plates 40.

Such filter plates 40 are in back-to-back relation in three angularly spaced hollow panels 39 extending from a location midway of the top and bottom of column 30 to a location adjacent the bottom edge 27 of tube 16, such panels being 120° from each other. The plates 40 on each side of each panel are set flush in the panel surfaces so that the ice bed rising along each side of each panel will not be impeded thereby, the panels being secured along their inner vertical edges to tube 16 and their outer edges to wall 34. The interior of panels 39 is open to the liquid from column 30 only through and at the level of filter plates 40, respectively. A radial outlet pipe 38 which leads outside device 12 is positioned at the bottom of each filter panel and is welded thereto so the liquid inside a panel 39 will empty into a slot in its pipe 38.

Saline water percolating upwardly in annular chamber 30, concurrently relative to the direction of movement of the annular ice bed, flows out through the perforated plates 40, down through the interior of the respective panels and out through the respective pipes 38. Wash water derived from melted ice is introduced downwardly into the top of the ice bed in chamber 30 and percolates downwardly countercurrent to the upward movement of the ice, displacing and washing down saline water which adheres to the ice as it rises in column 30. Both wash water and displaced saline water flow out of column 30 at the level of the perforated filter plates 40 and into the interior of the respective panels 39 for discharge through pipes 36 with saline water which had percolated upwardly to and through plates 40. Such downward percolation of the wash water continuously produces substantially salt-free washed ice at the top of the ice bed.

A liquid level in column 30 is maintained at least as high as the top of the perforated plates 40, so that these comprise submerged outlets, but below the level of liquid in column 16 to provide the difference in hydraulic head previously mentioned. The portion of ice bed above the perforated plates is subject to downward percolation by wash liquid and a part of that portion above the liquid level in column 30 is the part in a more or less non-flooded condition through which wash liquid is continuously draining. The drained and washed top of the ice bed is cut or chipped away and removed continuously permitting the annular bed of ice to continue its upward movement in column 30. The level in column 30 is established and may be adjusted simply by impounding such amount of water in the system as produces the level and maintaining or varying the balance of inflow and outflow to maintain or to vary the level.

This level is independent of the rate at which saline water may be recycled through the system although an increase in such recycle rate will tend to decrease the depth of the ice bed in column 30 below the bottom of the perforated plates, and vice versa.

In my experiments with laboratory apparatus I found that the best results were obtained by maintaining the bottom of the ice bed well below the level of the filter plates 40 and maintaining the water level in column 30 at least six or eight inches below the surface of the ice and well above the filter plates 40. These may be varied over a wide range; hence simple level control instrumentation may be used to govern the operation of the entire device either manually or automatically. This simplicity of controls is one of the advantages of my system.

Moreover, this system of separating and washing ice does not depend upon or employ the difference in specific gravity between ice and the saline solution. The buoyancy of ice in sea water will provide an upward flow of ice but experiments show this to be only in the order of three inches per hour which is much too slow for an economical commercial process. In the present invention the ice rapidly collects at the bottom of the liquid-permeable bed and lineal rates of upward flow in the order of five feet per hour of the consolidated bed have been maintained in experimental tests. The top surface of the ice above the liquid level, moreover, is also independent of the buoyancy of the ice thus permitting the liquid level to be freely levelable.

Ice rising in column 30 engages a rotating head 42 which engages the uppermost face of the rising ice bed to cut or chip it into fragments which move laterally outwardly into an annular outer column chamber 43. The ice bed rising in column 30 is prevented from rotating by a radial baffle 44 fixed in the upper portion of column 30 above and in planar alignment with one of the radial filter panels 39.

Head 42 rotates about a sleeve 43a having an annular flange 44 fixed to the outside of tube 16. Head 42 is provided with a cylindrical hub 45 to which are affixed horizontal axis rollers 46 which supportably engage flange 44 and vertical axis guide rollers 47 which roll around sleeve 43a. An annular platform 48 is supported on hub 45 and in turn carries an annular trough 49 made of three arcuate segments fixed together and interconnected by hose connections 50 so that the wash water level in each remains the same. As head 42 rotates, wash water is supplied by an inlet pipe 51 to the trough sections 49 in any rotation position of head 42, pipe 51 being supported by the upper portion of a casing 52 enclosing device 12 and, in the vertical portion thereof, forming the outer wall of column 43. A prime mover 53 mounted on the outside of device 12 has an enclosed sprocket chain drive 54 to rotate a drive sprocket wheel 55 fastened to hub 45 to turn head 42.

Head 42 also includes a pair of rigid downwardly diverging arms 56 and aprons 56a in diametrically opposed relation to rotate about the axis of device 12 and support prongs or blades 57 fixed to the leading edge of each arm to loosen, chip or cut ice, a wash water spray nozzle 58 fixed to the trailing edge of each apron 56a and a drag plate 59 pivotally connected to the outer end of each arm 56. The blades 57 generally project and engage the ice surface to separate the particles comprising the top surface thereof from the rest of the bed of ice in column 30. The leading edge 60 of each arm is also provided with beveled edge to assist in removing by loosening and separation of the topmost layer of ice to move it onto apron 56a where it moves downwardly into annular outer column 43 where it is to be melted. Nozzles 58 extend outwardly and are supplied with wash liquid from the troughs 49 by means of respective inlets 61 and flexible hoses 62. The nozzles have holes on the underside thereof and terminate at their respective outer ends at a position adjacent the upper edge of wall 34, so that the wash water sprayed thereby will be directed substantially wholly downwardly into column 30 over the upper surface of the bed of ice crystals moving upwardly therethrough. The drag plates 59 are respectively connected to the outer ends of the arms 56 by pivot pins 63 so that as head 42 is rotated in the direction of arrow 64, the plates 59 assist in leveling the top of the ice mass in melting column 43. Conical wall 34 forms the inner wall of chamber 43 and the inner surface of the vertical portion of casing 52 forms the outer wall surface of column 43 which column accordingly diverges somewhat in a downward direction. In order to minimize heat transference between washing chamber 30 and melting chamber 43, the wall 34 inner side of chamber 43 preferably is insulated.

The lower end of column 43 is closed by a crowned perforated ring plate 65 which enables potable water or the like from ice melted down in chamber 43 to run through the perforations in plate 65 into an annular collection chamber 66 below that plate while retaining ice on and above plate 65. Such melting preferably is achieved by using vaporized refrigerant as a melting agent by supplying it through vapor inlet 67 to chamber 66. Such vapor rises into the mass of ice resting on plate 65 and in the course of its movement in contact with ice in chamber 43 melts such ice and the refrigerant itself, in the case of normal butane, is condensed and liquefied so that such liquefied refrigerant also drains into collecting chamber 66 through the perforations in plate 65. Condensed refrigerant and the melted ice in chamber 66 preferably are pumped out together through an outlet pipe 68 to a decanter for physical separation by gravity of such liquefied butane and potable water.

Thus, in an exemplary operation, such potable water and butane liquid refrigerant may be pumped out through pipe 68 by a pump 69 which discharges through a pipe 70 into a decanter 71 for gravity separation of the product water and such butane liquid. The potable water product is removed from decanter 71 through a suction line 72 by a pump 73 and delivered through a pipe 74 to a place of use or to produce storage, except for such portion of the potable water as may be diverted through a branch pipe 75 to wash water inlet pipe 51, if another source of wash liquid is not used. Liquid butane separated in decanter 71 is pumped out through a suction line 76 by a butane liquid pump 77 which delivers such liquid butane through pipe 78 to a butane surge tank 79. Surge tank 79 is under pressure and supplies liquid butane under pressure through a pipe 80 and connection 24 to inner sparging ring 22 in freezer 11 for the making of slush ice by partial freezing of the saline water feed to that freezer as described above. Surge tank 79 also receives butane condensed in condenser 81 by indirect heat exchange utilizing, for example, any sufficiently cool stream, including one taken from elsewhere in the system. Butane vapor exiting through outlet 18 and a pipe 82 is compressed by primary compressor 83 and delivered through pipe 84 to chamber 66 through inlet 67 for the melting operation. A secondary compressor 85 receives vented butane vapor through a pipe 86 and compresses it sufficiently and sends it through a pipe 87 for condensing by cooling water in condenser 81 from which the liquid butane is discharged into tank 79.

Concentrated saline water from the interior of the respective panels 39 which passes through the outlets 38, is collected and delivered through a pipe 88 to a manifold 89 selectively connected to the inlets of a reject water pump 90 and a recycle water pump 91. Whatever amount of recycle water is desired for return via the feed flows through pipe 94, as regulated by the valve 94V, from pump 91 to saline water feed line 93. Feed line 93 is connected to fitting 25 which supplies the outer sparging ring 23 in freezer 11. A branch 95 controlled by a valve 95V regulates the flow of such recycle water as may be introduced into inner chamber 29 through inlet 35. The recycle water passes upwardly through the annular bed of ice in chamber 30 toward the perforated filter plates 40. The reject water, when the system has reached steady state equilibrium, comprises in general terms the quantity of saline water not recovered as potable water and is discharged by pump 90 through pipe 92 to waste, or preferably to indirect heat exchange with an incoming stream, or for other use or treatment, as the case may be. Normally the rate of reject water flow is adjusted by controlling valve 92V to maintain a constant desired liquid level in column 30, thus insuring that an equilibrium material balance is maintained during continuous operation and at the same time maintaining the optimum operating conditions obtained by initial adjustment of levels in the device.

Figure 9:
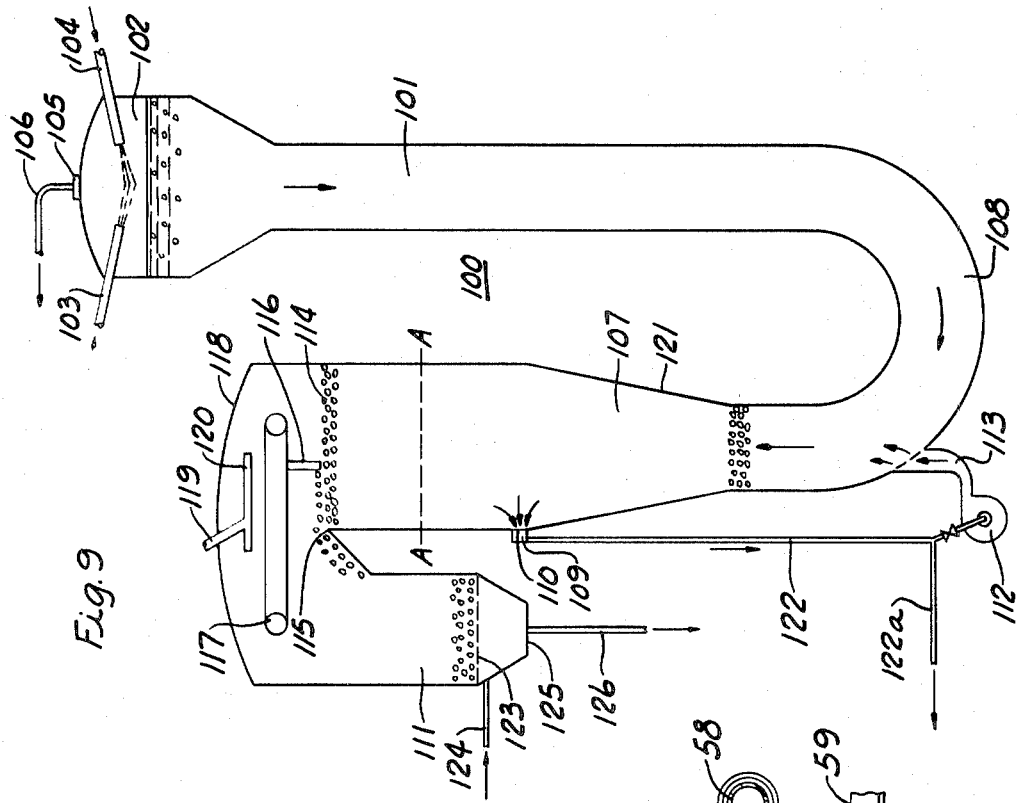
FIGURE 9 is a diagrammatic view in vertical section of another embodiment of my invention.
Figure 7:
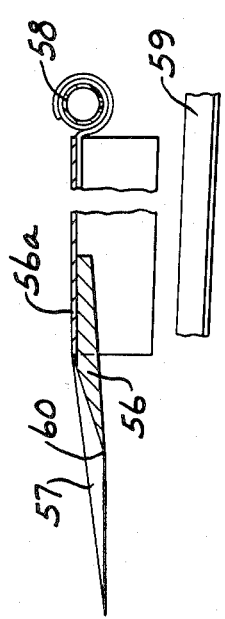
FIGURE 7 is a view in section taken along line VII—VII of FIGURE 5.
Figure 6:
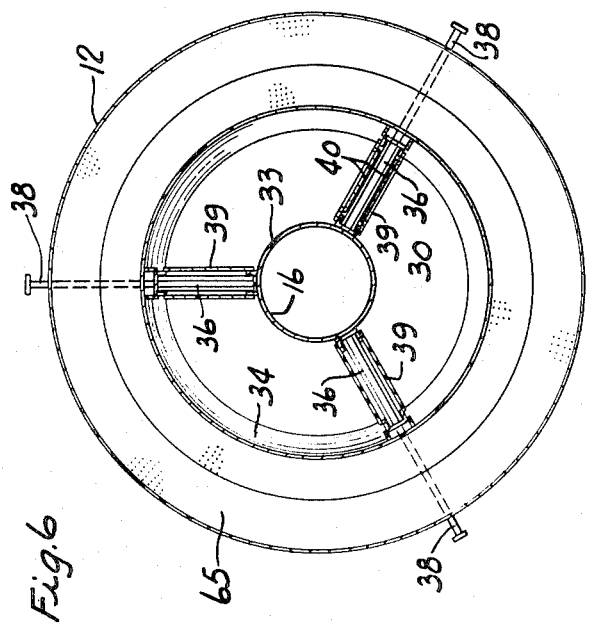
FIGURE 6 is a view in staggered section taken along line VI—VI of FIGURE 3.

Another embodiment of my invention is illustrated diagrammatically in FIGURE 9 and lends itself readily to construction on relatively large and reproducible scale or by a practice of this invention. The structure shown is generally sinusoidal in end elevation and may be made as long as desired, a unit twice as long having twice the capacity as a unit one-half such length inasmuch as the movement factors of the respective materials are the same, or a unit may be made of a standard length and more than one unit utilized for a numerically corresponding increase in capacity. The freezer-washer-melter 100 illustrated in FIGURE 9 is a single vessel comprising a series of legs having open communication with one another for generally unobstructed flow therethrough and operable by level controls.

The first leg 101 of device 100 is surmounted by a freezing chamber 102 into which, for example, a saline solution is fed through nozzle means 103. This solution intersects and mixes with a liquid refrigerant such as butane fed through nozzle means 104 and as the butane evaporates some of the saline solution freezes producing slush ice. The resultant vaporized refrigerant exits from chamber 102 through an outlet 105 and pipe 106. The slush ice, consisting of concentrated saline water and ice, collects in leg 101 from which it flows out as formed and descends through leg 101 and passes around bend 108 into leg washer 107. The level of liquid in leg 101 is higher than the height of the liquid in washer leg 107, the difference in level causing the flow of slush ice from leg 101, the two legs communicating freely at the respective bottoms thereof through bend 108. Leg 107 is provided with a liquid withdrawal member 109 at an appropriate location in the intermediate filter zone portion of the leg. A suitable screen or perforated plate 110 covers the withdrawal opening so that the ice is retained in leg 107 and continues to rise therein until it reaches a transfer zone where the top surface of the bed of ice in the washer leg 107 is dislodged and transferred to a melting leg 111.

The liquid level at A—A in leg 107 is maintained substantially constant in steady state operation by controlling outflow through the filter zone 109 to the extent of the net portion rejected by discharge from the system, rather than the amount of liquid recycled. A recycle pump 112 is connected by a pipe 122 between the opening 109 and a discharge conduit 113 entering device 100 at some point in advance of the bottom of the bed of ice which consolidates in leg 107, such conduit 113, as shown, returning recycle liquid to the lower end of leg 107 below such bottom. The combined flow of original and recycle liquid subjects the bed of ice to an upward force which is the product of the cross sectional area of the ice bed and the pressure drop in the concentrated saline water percolating upwardly through the liquid-permeable ice bed. The depth of the bed from zone 109 down varies inversely with the amount of liquid recycled. The consolidated bed of ice in leg 107 moves upwardly as it is formed by accumulation and consolidation of additional ice at its bottom, from the slush ice below such bottom. The net amount of liquid withdrawn through opening 109 and not recycled substantially matches the liquid entering the system which is not converted into ice and the part of the moving bed of ice above liquid level A—A progresses toward a drained, washed condition as it approaches the transfer zone where the ice on top thereof is loosened and scraped off into a melting leg 111. Casing 118 including melting leg 111 preferably is covered with suitable industrial lagging.

Washed ice at the top 114 of the bed is dislodged and conveyed to a wall edge 115 by cutting and scraping blades 116 driven by suitable means, e.g. a sprocket 117 moved by a prime mover (not shown) the shaft of which extends through a casing 118 enclosing device 100. Wash water discharges through nozzle means 119 into a distributor 120 in the top of leg 107 to wash down the upper portion of the bed of ice between the top of the leg 107 and the withdrawal means 109, such wash water percolating downwardly through the bed and exiting at 109 with the saline water. The continuous upward movement of the ice bed in leg 107 is facilitated by the flaring of the walls 121 of that leg. The reject water is discharged through a branch pipe 122a and is the selectively regulated part of the liquid withdrawn through zone 109 which is not recycled by pump 112.

The ice which is swept into melting leg 111 upon separation from the bed in leg 107 is supported by a perforated screen 123. Refrigerant vapor is admitted through nozzle means 124 below the screen so as to rise and penetrate the interstices in the ice mass above, melting such ice and condensing the refrigerant in the case of butane. Both the melt of the ice and the condensed refrigerant flow down through the screen and out through an outlet 125 and pipe 126 to separating equipment where the butane is recovered and the potable water or like product taken away.

It will be recognized that various changes may be made in the piping of embodiments of this invention, in the use of indicating and control instruments and in details of the freezer-washer-melter devices shown, or portions thereof. Various changes also may be made in the starting material, in product specification, in the vaporizable refrigerant selected, and correspondingly in the pressure and temperature conditions utilized, to provide a continuous system operation under this invention with material flows in and out of the process area in equilibrium to produce potable or other solute-free water, or alternatively concentrated saline water, or both, as products, within the scope of the appended claims.

I claim:

1. Method for recovering solute-free water from solute-containing water or the like, comprising, in combination, freezing solute-containing water to produce ice in a confined space in the upper portion of a hydraulic column, forming a percolation bed of said ice in an adjacent column in open communication with the lower portion of said first-named column, supporting said bed in liquid by percolating said liquid through said bed concurrently upwardly from below said bed, percolating wash liquid countercurrently downwardly through an upper portion of said bed, withdrawing substantially all liquid percolating respectively upwardly and downwardly through said bed from an intermediate zone of said bed, and removing at least upper portions of said bed as washed ice.

2. Method as set forth in claim 1, in which said freezing includes introducing an immiscible vaporizable refrigerant with said saline water under conditions causing mixing and removal of heat from said saline water to freeze a part of said saline water and to vaporize said refrigerant, said ice as produced being mingled with said liquid in slush form and moved in slush flow into a position where said bed of said ice is formed and supported in said liquid, said liquid percolating upwardly is concentrated saline water, said wash liquid percolating downwardly having a composition at least initially approaching that of said ice, said slush flow and upward percolation consolidating said bed of ice and maintaining upward flow thereof through said intermediate zone, and melting said removed ice to recover solute-free water or the like as a product.

3. Method for continuously desalting saline water to produce potable water or the like, comprising, in combination, freezing saline water by mixing it with a vaporizable immiscible liquid phase refrigerant to produce ice in slush ice form with concentrated saline water in a hydraulic column, forming an upwardly moving consolidated bed of said ice in a further column in open communication with said first-named column by percolating concentrated saline water upwardly through the lower portion of said bed concurrently with the direction of movement of said bed, adding ice from said slush ice continuously to the bottom of said bed, percolating a wash liquid downwardly through the upper portion of said bed, withdrawing substantially all liquid percolating upwardly and downwardly through said bed from a portion of said bed between the top and bottom thereof, maintaining the top level of liquid in said bed below the top of said bed, and at or above the level of said withdrawing of liquid, removing the top of said bed as drained washed ice into a still further column in open communication with said further column, and melting said removed ice in said still further column.

4. Method for continuously washing ice produced by the freezing of saline water, comprising, in combination, providing a percolation bed of said ice in a washing zone of upwardly extending predetermined cross sectional area, flowing liquid thereinto to percolate from the bottom of said bed upwardly through the lower portion of said bed and to continuously lift said bed to at least assist in consolidating the same, adding ice continuously to said liquid in the lower portion of said zone to deposit on and consolidate at the bottom of said bed as the liquid percolates therethrough, percolating wash liquid downwardly through the upper portion of said bed at a rate sufficient to wash at least the uppermost part of said bed, withdrawing substantially all liquid percolating upwardly and downwardly through said bed from an intermediate portion of said zone in the path of said bed as it is lifted, fragmenting and removing said washed uppermost part of said bed as it is lifted with the consolidated bed, and melting said removed washed part by contact with a condensable vapor.

5. Method for continuously desalting saline water, comprising, in combination, feeding saline water and vaporizable liquid refrigerant into a chamber, flash freezing a portion of the saline water by vaporization of said liquid refrigerant in admixture with said saline water to provide slush ice, feeding said slush ice downwardly in a column by gravity, guiding said slush ice into the bottom of a second column to flow upwardly therein, forming an upwardly moving bed of consolidated ice in said second column, percolating the liquid portion of said slush ice remaining after forming said bed of consolidated bed partway through said ice in a concurrent direction relative to the upward movement of said bed, spraying wash liquid at the upper end of said second column to percolate countercurrently through said bed to wash the upper portion thereof, withdrawing from said second column substantially all liquid percolating through said bed of ice in either direction at a location intermediate the top and bottom of said consolidated bed, maintaining the top of said liquid within said second column at a level below the top of said bed of ice, above said level loosening the washed top of said bed of ice and transferring it from said second column to a melting chamber supporting washed ice in said melting chamber on a screen, and supplying vaporized refrigerant to said ice in said melting chamber to melt the same.

6. Apparatus for concentrating solute-containing water or the like to make substantially solute-free water or the like, comprising, in combination, a first hydraulic column, means connected to the upper part of said first column for partial freezing of solute-containing water or the like by admixture with a vaporizable refrigerant in liquid phase to produce slush ice for said first column, a second hydraulic column to receive said slush ice, means for forming a concurrent liquid flow supported consolidated bed of said ice in said second column, filter means in the wall of said second column to retain said bed of ice within said second column and to remove liquid flowing through said bed of ice, said filter means being located at a position intermediate the top and bottom of said bed of ice, means connecting with said filter means for removing substantially all liquid from the apparatus at a predetermined rate to maintain a selected level of liquid in said bed of ice, means for introducing wash liquid downwardly at the upper end of said second hydraulic column, and means in open communication with said second column for removing the washed upper portion of said bed of ice from said second column for recovery of solute-free water or the like therefrom by the melting thereof.

7. Method for continuously desalting saline water, comprising, in combination, providing a flowable mixture of a liquid and ice formed by freezing a predetermined quantity of saline water, feeding said flowable mixture into the lower portion of a column to move upwardly therein, forming said ice into an upwardly moving consolidated porous bed in said column, passing the liquid in said flowable mixture into said bed in a concurrent direction relative to the upward movement of said bed, withdrawing substantially all of said concurrent liquid from said column at a location intermediate the top and bottom of said bed, supplying wash liquid to the top of said bed in said column to pass thereinto in a countercurrent direction relative to the upward movement of said bed to wash the ice in the upper portion thereof, withdrawing substantially all of said countercurrent wash liquid from said column at a location intermediate the top and bottom of said bed, and maintaining the liquid level in said bed below the top thereof and at least as high as said locations.

8. Method for continuously separating the liquid and solid particles within an aqueous slurry comprising, in combination, providing a flowable aqueous slurry of a liquid and solid particles, feeding said flowable slurry into the lower portion of an open column to move upwardly therein, forming said solid particles into an upwardly moving consolidated porous bed in said open column, passing the liquid in said flowable slurry in said bed in a concurrent direction relative to the upwardly movement of substantially all of said concurrent bed, withdrawing said liquid from said open column at a location intermediate the top and bottom of said bed, supplying a wash liquid to the top of said bed in said open column to pass thereinto in a countercurrent direction relative to the upward movement of said bed to wash the solids in the upper portion thereof, withdrawing substantially all of said countercurrent wash liquid from said column at the location intermediate the top and bottom of said bed where said other liquid is being withdrawn, and maintaining the liquid level in said bed below the top thereof and at least as high as said location, fragmenting and removing said washed uppermost part of said bed as it is lifted with the consolidated bed.

References Cited by the Examiner
UNITED STATES PATENTS

| | | | |
|---|---|---|---|
| 3,012,409 | 12/1961 | Ashley | 62—58 |
| 3,049,889 | 8/1962 | Carfagno. | |
| 3,070,969 | 1/1963 | Ashley | 62—68 |
| 3,073,131 | 1/1963 | Ashley | 62—58 |
| 3,119,772 | 1/1964 | Hess | 62—58 X |

FOREIGN PATENTS 217,766 10/1958. Australia.

NORMAN YUDKOFF, *Primary Examiner.*
ROBERT F. BURNETT, *Examiner.*
G. P. HINES, *Assistant Examiner.*